Dec. 28, 1937.  L. L. SALFISBERG  2,103,388
PACKAGING FEEDING SYSTEM
Filed Oct. 5, 1935
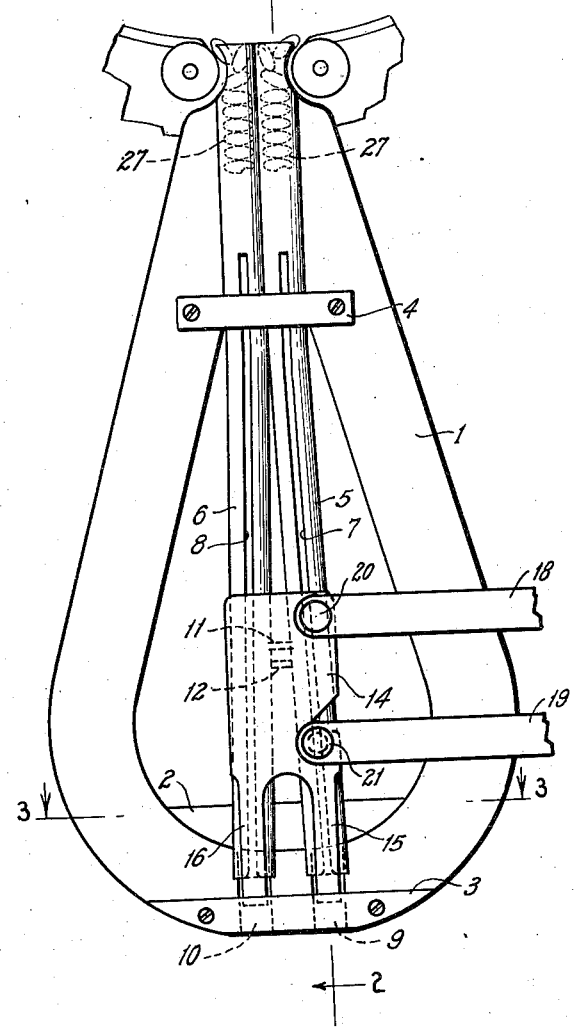
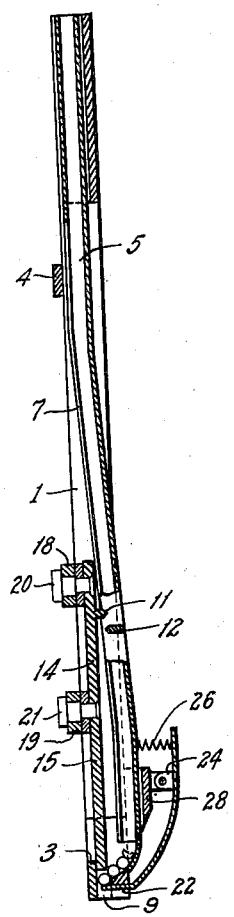
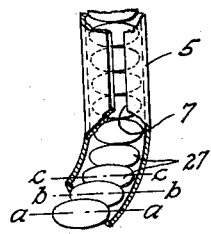
INVENTOR.
Leroy L. Salfisberg
BY Gordon B Scheitzell
ATTORNEY.

Patented Dec. 28, 1937

2,103,388

UNITED STATES PATENT OFFICE 2,103,388

PACKAGING FEEDING SYSTEM

Leroy L. Salfisberg, South Orange, N. J., assignor to Ivers-Lee Company, Newark, N. J., a corporation of Delaware Application October 5, 1935, Serial No. 43,706

2 Claims. (Cl. 226—2)

This invention relates to an improvement in article feeding mechanisms of a form which may be conveniently used in connection with packaging machines, more particularly of the type designed to package articles having major and minor dimensions, such as medicinal tablets, oval shaped capsules and the like.

One of the objects of this invention is to provide an apparatus to control the positioning of the axes of articles having major and minor dimensions and to properly feed and space such articles for plural formation packages.

Another object is to provide in the apparatus a plural system of delivery of articles to packaging strips, after they have been withdrawn from a hopper, and in a manner such as to produce a rapid and continuous supply of the articles presented in predetermined positions of spacing for a packaging operation with the articles evenly spaced and with corresponding dimensions of the articles uniformly positioned with respect to the packaging strip.

One embodiment of this invention is illustrated in the drawing accompanying the specifications in which:

Fig. 1 is a front elevation of apparatus in accordance with the invention;

Fig. 2 is a vertical section along the line 2—2 of Fig. 1;

Fig. 3 is a transverse section along the line 3—3 of Fig. 1; and

Fig. 4 is a cut-away fragmentary perspective section of the discharge end of one of the article feeding chutes.

The machine of this invention contemplates presenting at a given point and at a suitable high rate of speed, a succession of articles in a uniform predetermined position, such articles being withdrawn from a hopper where they have been placed without regard to their individual or relative positions. The invention also provides feeding means for controlling the feeding of ovoid and other shaped articles having non-uniform dimensions so as to insure a free and unobstructed flow of such articles and to maintain such articles in a predetermined position as they emerge from the feeding means.

Referring to the drawing in detail and particularly to Fig. 1, there is provided a harp shaped mounting frame 1, reinforced by cross-bar members 2, 3 and 4. In the frame 1, loosely mounted therein are two metal tube shaped chutes 5 and 6, of similar construction and each provided with an open slot 7 and 8, through which the articles 27, in gravitating down through the chutes 5 and 6, can be readily inspected.

The chutes 5 and 6 are joined together at the top for approximately one third of their length and then gradually diverged so as to engage the slot openings 9 and 10, provided in the bottom of the mounting frame 1. These slot openings 9 and 10 allow for the discharge of the commodity articles as they descend by gravity through the chutes.

These openings in the mounting frame are provided with trap members 22 and 23, to halt the commodity articles as they descend the chutes and operate to automatically release one article from each chute at a time, so as to facilitate a constant and perfectly timed feed of the articles from the chutes to the packaging rollers. The trap member 22, in Fig. 2, is pivoted by member 24 attached to a cross bar member 28 which is itself attached to the mounting frame 1. At the upper end of trap member 22, there is provided a spring 26 which regulates the tension of the trap member 22 as it moves to release the commodity article at the end of the chute 5. A similar arrangement of mechanism is provided for chute 6.

Reciprocatively mounted adjacent chutes 5 and 6, is a bifurcated plunger member 14, the legs of which are in alignment with the slot openings 9 and 10. The plunger member 14 is provided on one side with a lug extension 11 adapted to engage with a lug extension 12 mounted between the chutes 5 and 6 so that a downward movement of the plunger produces a tapping vibration of the chutes as these lug extensions 11 and 12 strike and pass each other. This vibration set up in the chutes facilitates the downward movement of the articles therein and eliminates any tendency of the articles to jam or adhere to the walls of the chutes or to each other. At the same time, such a tapping vibration causes the articles to align themselves along their major axes, thus imparting to them a position in which they readily pass or roll to contact with the upper surface of the trap members 22 and 23.

As the two legs 15 and 16 of the plunger 14, actuated by the drive bars 18 and 19, descend, they contact the articles positioned and held by the trap members 22 and 23, and act through the articles to cause the release of the trap members 22 and 23, thereby forcing the articles through the slot openings 9 and 10 to position the articles with respect to the package material being fed through the packaging rollers of a suitable packaging mechanism. As the plunger legs 15 and 16 return to their original position after expelling the articles, the trap members 22 and 23 spring back to trap the succeeding articles, thus completing an article feeding cycle of operations.

Fig. 4 illustrates the relative position of the articles 27 when in the form of oval capsules, as they pass down through to the discharging end of the chutes, rolling along their major axes a—a, b—b, c—c and emerging to engage the trap member 22 as shown in Fig. 2.

In operation, in one embodiment of the invention, the articles, having both major and minor axes, are fed into the two combined chutes 5 and 6 from a suitable hopper. As the articles descend the chutes by gravitation, a vibratory agitation is set up in the chutes by the action of the plunger lug extension in descending to expel the articles. This vibratory agitation tends to cause a rearrangement of the articles in the chutes so that they assume a position along their major axes one above the other in file formation. As the bottom articles reach the discharge end of the chutes, they assume a position immediately above the trap members 22 and 23 and in juxtaposition with the legs of the plunger. As the plunger 14 descends into contact with the articles to expel them, in timed relationship, through openings 9 and 10, the plunger 14 acts to release the trap members 22 and 23. After expelling the articles, the plunger returns to its original position and as it rises, the trap members 22 and 23 automatically resume their former position through the action of the springs 26 and thus act to retain the succeeding articles within the chutes, thereby insuring a continuous flow of articles through the feeding mechanism.

Although the foregoing discloses one form of article feeding means of my invention, it will be understood that various changes can be made without departing from the scope of the invention.

I do not, therefore, desire to limit myself to the foregoing except as may be pointed out in the appended claims.

What I claim as new and desire to secure by Letters Patent of the United States is:

1. Article feeding means comprising, a mounting structure, a plurality of tubes carried by said mounting structure and having an elliptical cross-section, chamber means carried by said structure and comprising channels to which said tubes open, trap means for normally closing said channels, and plunger means rectilinearly movable through said channels for removing articles from said chamber means through said channels while actuating said trap means, said tubes and said chamber means being constructed so as to roll articles of ovoid formation into said channels along their minor axes, and said tubes being loosely carried by said mounting structure, and an arrangement included in said plunger means for agitating said tubes by its rectilinear motion so as to effect the alignment of articles within said tube.

2. Article feeding means comprising, a mounting structure including a rectilinear chamber having an outlet, a movable trap element normally held in position to obstruct the outlet of said chamber, a chute of effectively elliptical cross-section for feeding ovoid articles with the minor dimensions of such articles extending longitudinal of said chute, said chute being connected with an opening to said chamber for establishing a file of said articles in said chute extending into said chamber above said trap element, the construction of said chute being such as to permit said articles to be moved into said chamber along a path extending through their minor dimensions, and a picker element operating through said chamber to engage the end-most article of said file of articles in said chamber and move the same against said trap member and out of the chamber, said picker element acting to interrupt the flow of said ovoid articles through said chute to said chamber, while said selected article is being expelled from said chamber.

LEROY L. SALFISBERG.